US010713288B2

(12) United States Patent
Andreas et al.

(10) Patent No.: US 10,713,288 B2
(45) Date of Patent: Jul. 14, 2020

(54) NATURAL LANGUAGE CONTENT GENERATOR

(71) Applicant: Semantic Machines, Inc., Newton, MA (US)

(72) Inventors: Jacob Daniel Andreas, Berkeley, CA (US); David Leo Wright Hall, Berkeley, CA (US); Daniel Klein, Orinda, CA (US); Adam David Pauls, Berkeley, CA (US)

(73) Assignee: Semantic Machines, Inc., Newton, MA (US)

( * ) Notice: Subject to any disclaimer, the term of this patent is extended or adjusted under 35 U.S.C. 154(b) by 0 days.

(21) Appl. No.: 15/892,194

(22) Filed: Feb. 8, 2018

(65) Prior Publication Data

US 2018/0246954 A1    Aug. 30, 2018

Related U.S. Application Data

(60) Provisional application No. 62/456,574, filed on Feb. 8, 2017.

(51) Int. Cl.
  *G06F 16/332* (2019.01)
  *G06F 16/335* (2019.01)
  (Continued)

(52) U.S. Cl.
  CPC .......... *G06F 16/3329* (2019.01); *G06F 40/30* (2020.01); *G06F 40/56* (2020.01);
  (Continued)

(58) Field of Classification Search
  CPC ..................................................... G06F 40/56
  (Continued)

(56) References Cited

U.S. PATENT DOCUMENTS 5,995,918 A    11/1999   Kendall et al.
6,173,261 B1   1/2001    Arai et al.
(Continued)

FOREIGN PATENT DOCUMENTS

EP    1352317 A2    10/2003
EP    3374880 A1    9/2018
(Continued)

OTHER PUBLICATIONS

PCT Application No. PCT/US2018/017465 International Search Report and Written Opinion dated May 2, 2018.
(Continued)

*Primary Examiner* — Daniel C Washburn
*Assistant Examiner* — Timothy Nguyen
(74) *Attorney, Agent, or Firm* — Alleman Hall Creasman & Tuttle LLP

(57) ABSTRACT

A system that generates natural language content. The system generates and maintains a dialogue state representation having a process view, query view, and data view. The three-view dialogue state representation is continuously updated during discourse between an agent and a user, and rules can be automatically generated based on the discourse. Upon a content generation event, an object description can be generated based on the dialogue state representation. A string is then determined from the object description, using a hybrid approach of the automatically generated rules and other rules learned from annotation and other user input. The string is translated to text or speech and output by the agent. The present system also incorporates learning techniques, for example when ranking output and processing annotation templates.

20 Claims, 12 Drawing Sheets

(51) Int. Cl.
*G06F 40/30* (2020.01)
*G06F 40/56* (2020.01)
*G10L 15/26* (2006.01)
*G10L 13/04* (2013.01)

(52) U.S. Cl.
CPC ............ *G06F 16/337* (2019.01); *G10L 13/04* (2013.01); *G10L 15/265* (2013.01)

(58) Field of Classification Search
USPC ........................................................ 704/270
See application file for complete search history.

(56) References Cited

U.S. PATENT DOCUMENTS

| | | | |
|---|---|---|---|
| 6,173,266 B1 | 1/2001 | Marx et al. | |
| 6,192,343 B1 | 2/2001 | Morgan et al. | |
| 6,292,771 B1 | 9/2001 | Haug et al. | |
| 6,430,551 B1 | 8/2002 | Thelen et al. | |
| 7,133,827 B1 | 11/2006 | Gillick et al. | |
| 7,698,136 B1 | 4/2010 | Nguyen et al. | |
| 7,725,308 B2 | 5/2010 | Russell | |
| 7,933,774 B1 | 4/2011 | Begeja et al. | |
| 8,660,849 B2* | 2/2014 | Gruber ..................... G10L 15/22 704/275 |
| 8,706,486 B1 | 4/2014 | Devarajan et al. | |
| 9,104,754 B2 | 8/2015 | Wedeniwski | |
| 9,275,641 B1* | 3/2016 | Gelfenbeyn ............ G10L 15/22 |
| 9,280,610 B2 | 3/2016 | Gruber et al. | |
| 9,318,109 B2 | 4/2016 | Boies et al. | |
| 9,348,805 B1 | 5/2016 | Uszkoreit et al. | |
| 9,390,087 B1 | 7/2016 | Roux et al. | |
| 9,495,331 B2 | 11/2016 | Govrin et al. | |
| 9,772,993 B2 | 9/2017 | Braga et al. | |
| 9,830,315 B1 | 11/2017 | Xiao et al. | |
| 10,042,844 B2 | 8/2018 | Anand et al. | |
| 10,607,504 B1 | 3/2020 | Ramanarayanan et al. | |
| 2002/0032564 A1 | 3/2002 | Ehsani et al. | |
| 2002/0173955 A1 | 11/2002 | Reich | |
| 2003/0144055 A1 | 7/2003 | Guo et al. | |
| 2004/0083092 A1* | 4/2004 | Valles ..................... G06F 17/271 704/9 |
| 2004/0193420 A1 | 9/2004 | Kennewick et al. | |
| 2004/0236575 A1 | 11/2004 | Goronzy et al. | |
| 2005/0080629 A1 | 4/2005 | Attwater et al. | |
| 2005/0105712 A1 | 5/2005 | Williams et al. | |
| 2005/0197828 A1 | 9/2005 | Mcconnell et al. | |
| 2005/0278180 A1* | 12/2005 | O'Neill ................ G10L 15/1822 704/275 |
| 2006/0123358 A1 | 6/2006 | Lee et al. | |
| 2006/0136227 A1 | 6/2006 | Mizutani et al. | |
| 2007/0174043 A1 | 7/2007 | Makela | |
| 2007/0185702 A1 | 8/2007 | Harney et al. | |
| 2008/0167876 A1 | 7/2008 | Bakis et al. | |
| 2008/0184164 A1 | 7/2008 | Di fabbrizio et al. | |
| 2009/0327263 A1 | 12/2009 | Maghoul | |
| 2010/0217597 A1 | 8/2010 | Begeja et al. | |
| 2011/0015925 A1 | 1/2011 | Xu et al. | |
| 2011/0301943 A1 | 12/2011 | Patch | |
| 2012/0081371 A1 | 4/2012 | Ozkaragoz et al. | |
| 2012/0265534 A1 | 10/2012 | Coorman et al. | |
| 2013/0080167 A1 | 3/2013 | Mozer | |
| 2013/0111348 A1* | 5/2013 | Gruber ..................... G10L 15/22 715/727 |
| 2013/0185074 A1 | 7/2013 | Gruber et al. | |
| 2013/0275138 A1 | 10/2013 | Gruber et al. | |
| 2013/0275899 A1 | 10/2013 | Schubert et al. | |
| 2014/0067375 A1* | 3/2014 | Wooters ................ G06F 17/279 704/9 |
| 2014/0142924 A1 | 5/2014 | Friedman | |
| 2014/0149112 A1 | 5/2014 | Kalinli-Akbacak | |
| 2014/0180692 A1 | 6/2014 | Joshi et al. | |
| 2014/0278343 A1* | 9/2014 | Tran ..................... G06F 17/2785 704/2 |
| 2014/0316782 A1 | 10/2014 | Tzirkel-Hancock et al. | |
| 2015/0032443 A1 | 1/2015 | Karov et al. | |
| 2015/0066479 A1* | 3/2015 | Pasupalak ............... G06F 17/27 704/9 |
| 2015/0169758 A1* | 6/2015 | Assom ..................... G06F 16/36 707/603 |
| 2015/0364128 A1 | 12/2015 | Zhao et al. | |
| 2016/0034448 A1* | 2/2016 | Tran ..................... G06F 17/2785 704/277 |
| 2016/0048504 A1* | 2/2016 | Narayanan .......... G06F 17/2755 704/9 |
| 2016/0062981 A1 | 3/2016 | Dogrultan et al. | |
| 2016/0078866 A1 | 3/2016 | Gelfenbeyn et al. | |
| 2016/0180853 A1 | 6/2016 | Vanlund et al. | |
| 2016/0188610 A1 | 6/2016 | Bhatia et al. | |
| 2016/0259767 A1 | 9/2016 | Gelfenbeyn et al. | |
| 2016/0260029 A1 | 9/2016 | Gelfenbeyn et al. | |
| 2016/0314791 A1 | 10/2016 | Wang et al. | |
| 2016/0322050 A1 | 11/2016 | Wang et al. | |
| 2016/0342702 A1 | 11/2016 | Barve et al. | |
| 2017/0148073 A1 | 5/2017 | Nomula et al. | |
| 2017/0228372 A1* | 8/2017 | Moreno ............ G06F 16/24522 |
| 2017/0300831 A1 | 10/2017 | Gelfenbeyn et al. | |
| 2017/0309149 A1 | 10/2017 | Kaura | |
| 2017/0316777 A1 | 11/2017 | Perez et al. | |
| 2017/0323636 A1* | 11/2017 | Xiao ..................... G06F 16/332 |
| 2017/0330077 A1 | 11/2017 | Williams et al. | |
| 2018/0061408 A1 | 3/2018 | Andreas et al. | |
| 2018/0114522 A1 | 4/2018 | Hall et al. | |
| 2018/0293483 A1 | 10/2018 | Abramson et al. | |
| 2019/0066660 A1 | 2/2019 | Liang et al. | |

FOREIGN PATENT DOCUMENTS

| | | |
|---|---|---|
| WO | 2006016308 A1 | 2/2006 |
| WO | 2006037219 A1 | 4/2006 |
| WO | 2014015267 A2 | 1/2014 |
| WO | 2016114922 A1 | 7/2016 |

OTHER PUBLICATIONS

PCT Application No. PCT/US2017/048384 International Search Report and Written Opinion dated Nov. 22, 2017.
PCT Application No. PCT/US2017/058138 International Search Report and Written Opinion dated Jan. 5, 2018.
"Non-Final Office Action Issued in U.S. Appl. No. 15/669,795", dated Jul. 11, 2018, 13 Pages.
"International Search Report & Written Opinion Issued in PCT Application No. PCT/US2017/060134", dated Jan. 29, 2018, 6 Pages.
"International Search Report & Written Opinion Issued in PCT Application No. PCT/US2018/019556", dated May 29, 2018, 10 Pages.
"Non Final Office Action Issued in U.S. Appl. No. 15/804,093", dated May 13, 2019, 15 Pages.
Wang, et al., "Building a Semantic Parser Overnight", In Proceedings of the Annual Meeting of the Association for Computational Linguistics, 2015, pp. 1332-1342.
"Non Final Office Action Issued in U.S. Appl. No. 15/904,125", dated Jul. 12, 2019, 15 Pages.
"Final Office Action Issued in U.S. Appl. No. 15/669,795", dated Jan. 7, 2019, 19 Pages.
"Final Office Action Issued in U.S. Appl. No. 15/804,093", dated Sep. 4, 2019, 18 Pages.
"Non Final Office Action Issued in U.S. Appl. No. 15/974,650", dated Dec. 26, 2019, 13 Pages.
"Non Final Office Action Issued in U.S. Appl. No. 15/804,093", dated Feb. 4, 2020, 23 Pages.
"Notice of Allowance Issued in U.S. Appl. No. 16/036,622", dated Mar. 10, 2020, 10 Pages.
"Supplementary Search Report Issued in European Application No. 18751475.7", dated Apr. 20, 2020, 11 Pages.
"Non Final Office Action Issued in U.S. Appl. No. 16/115,491", dated May 13, 2020, 15 Pages.

(56) References Cited

OTHER PUBLICATIONS

"Extended European Search Report Issued in European Patent Application No. 18756646.8", dated May 27, 2020, 8 Pages.
"Extended European Search Report Issued in European Patent Application No. 17867628.4", dated May 15, 2020, 9 Pages.

* cited by examiner

NATURAL LANGUAGE CONTENT GENERATOR

CROSS REFERENCE TO RELATED APPLICATIONS

The present application claims the priority benefit of U.S. provisional patent application No. 62/456,574, filed on Feb. 8, 2017, titled "Natural Language Content Generator," the disclosure of which is incorporated herein.

BACKGROUND

Dialogues systems are designed to interact with users and, at some point, need to determine what to say and how to say it. For slot filled systems of the prior art, they systems are designed with a fixed number of behaviors that the system can perform. Hence, for a specific behavior, a human engineer has written what should be said by the slot filled system. What is needed is an improved dialogue assistant that provides output to a user.

SUMMARY

The present technology, roughly described, provides a system for generating natural language content. The system generates and maintains a dialogue state representation having a process view, query view, and data view. The three-view dialogue state representation is continuously updated during discourse between an agent and a user, and rules can be automatically generated based on the discourse. Upon a content generation event, an object description can be generated based on the dialogue state representation. A string is then determined from the object description, using a hybrid approach of the automatically generated rules and other rules learned from annotation and other user input. The string is translated to text or speech and output by the agent. The hybrid approach to generate a natural language content utilizes automatically generated rules and for low level discourse, such as collecting data from a user, and annotation and other user input-based templates for high level discourse. The present system also incorporates learning techniques, for example when ranking output and processing annotation templates.

In some instances, a method and system are disclosed for providing a conversational system that generates natural language content. Discourse is conducted between a user and an agent executing on a computing device. A dialogue state representation is updated based on the discourse. An object description is generated based on rules automatically created from the discourse, annotation data, and the present state of the dialogue state representation. A natural language output string is generated based on the object.

DETAILED DESCRIPTION

The present technology, roughly described, provides a system for generating natural language content. The system generates and maintains a dialogue state representation having a process view, query view, and data view. The three-view dialogue state representation is continuously updated during discourse between an agent and a user, and rules can be automatically generated based on the discourse. Upon a content generation event, an object description can be generated based on the dialogue state representation. A string is then determined from the object description, using a hybrid approach that utilizes the automatically generated rules and other rules learned from annotation and other user input. The string is translated to text or speech and output by the agent.

The hybrid approach to generate a natural language content utilizes automatically generated rules and for low level discourse, such as collecting data from a user, and annotation and other user input-based templates for high level discourse. The automatically generated rules are used to handle decisions about what the agent says or generates during discourse. User annotations and other user input are used to generate natural language content for a top-level description of things, which may better imitate what actual people do or say during discourse. The hybrid approach is efficient and does not require a huge quantity of rules and/or templates be generated for an automated assistant.

The present system incorporates learning techniques, for example when ranking output and processing annotation templates. The learning component can get human agents to rank generation output and use a learning model to reproduce the ranking the learning component is also able to get human agents to take annotator content in the context of an initial system state and use that information to induce a collection of rules.

Figure 1:
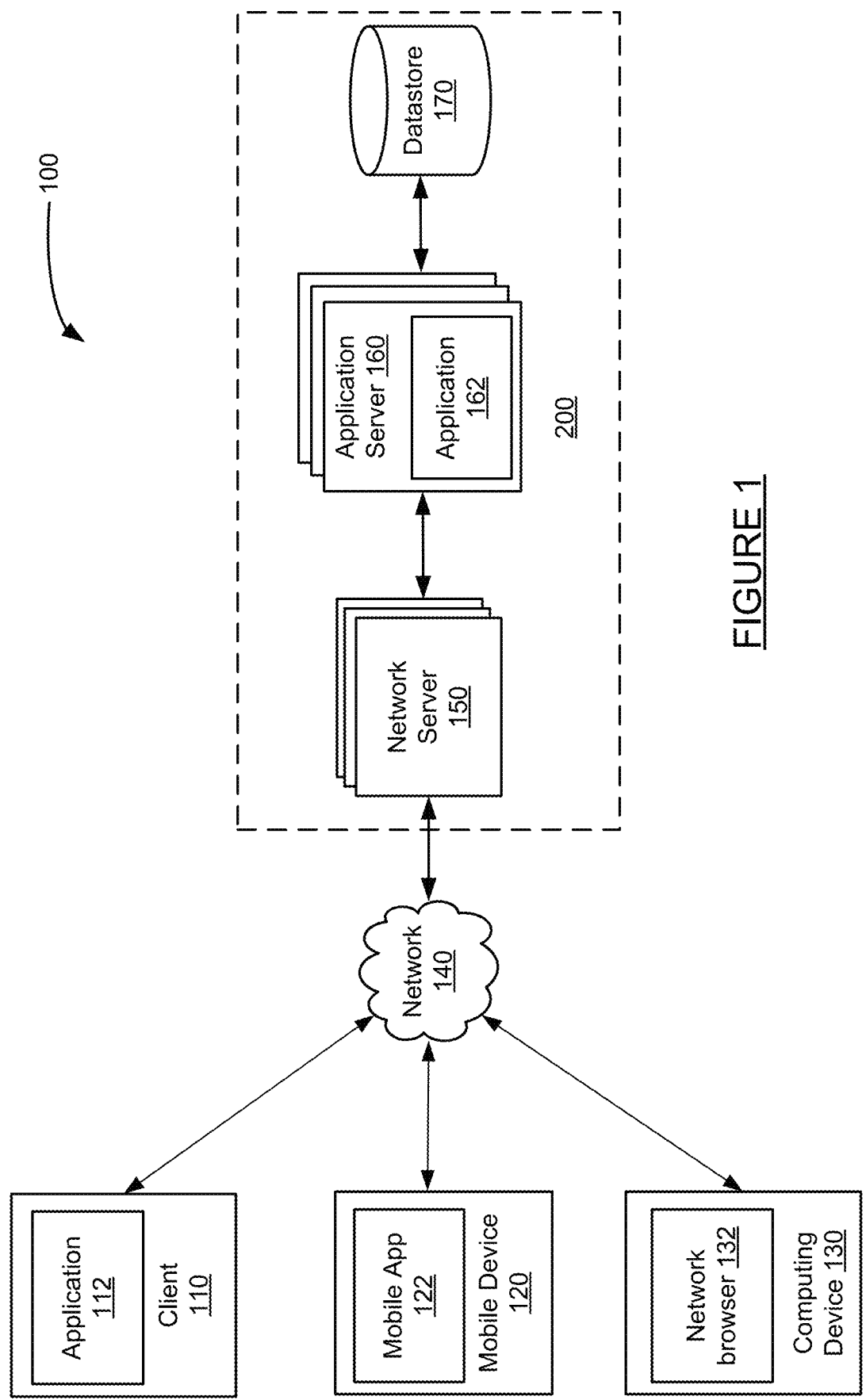
FIG. 1 illustrates an exemplary block diagram of a system for generating natural language content.

FIG. 1 illustrates an exemplary block diagram of a system for generating natural language content. System 100 of FIG. 1 includes client 110, mobile device 120, computing device 130, network 140, network server 150, application server 160, and data store 170. Client 110, mobile device 120, and computing device 130 communicate with network server 150 over network 140. Network 140 may include a private network, public network, the Internet, and intranet, a WAN, a LAN, a cellular network, or some other network suitable for the transmission of data between computing devices of FIG. 1.

Client 110 includes application 112. Application 112 may provide an automated assistant, TTS functionality, automatic speech recognition, parsing, content generation, and other functionality discussed herein. Application 112 may be implemented as one or more applications, objects, modules, or other software. Application 112 may communicate with application server 160 and data store 170 through the server architecture of FIG. 1 or directly (not illustrated in FIG. 1) to access data.

Mobile device 120 may include a mobile application 122. The mobile application may provide the same functionality described with respect to application 112. Mobile application 122 may be implemented as one or more applications, objects, modules, or other software, and may operate to provide services in conjunction with application server 160.

Computing device 130 may include a network browser 132. The network browser may receive one or more content pages, script code and other code that when loaded into the network browser the same functionality described with respect to application 112. The content pages may operate to provide services in conjunction with application server 160.

Network server 150 may receive requests and data from application 112, mobile application 122, and network browser 132 via network 140. The request may be initiated by the particular applications or browser applications. Network server 150 may process the request and data, transmit a response, or transmit the request and data or other content to application server 160.

Application server 160 includes application 162. The application server may receive data, including data requests received from applications 112 and 122 and browser 132, process the data, and transmit a response to network server 150. In some implementations, the network server 152 forwards responses to the computer or application that originally sent the request. Application's server 160 may also communicate with data store 170. For example, data can be accessed from data store 170 to be used by an application to provide the functionality described with respect to application 112. Application server 160 includes application 162, which may operate in a similar manner to application 112 except implemented all or in part on application server 160.

Block 200 includes network server 150, application server 160, and data store 170, and may be used to implement an automated assistant that includes a content generation mechanism. Block 200 is discussed in more detail with respect to FIG. 2.

Figure 2:
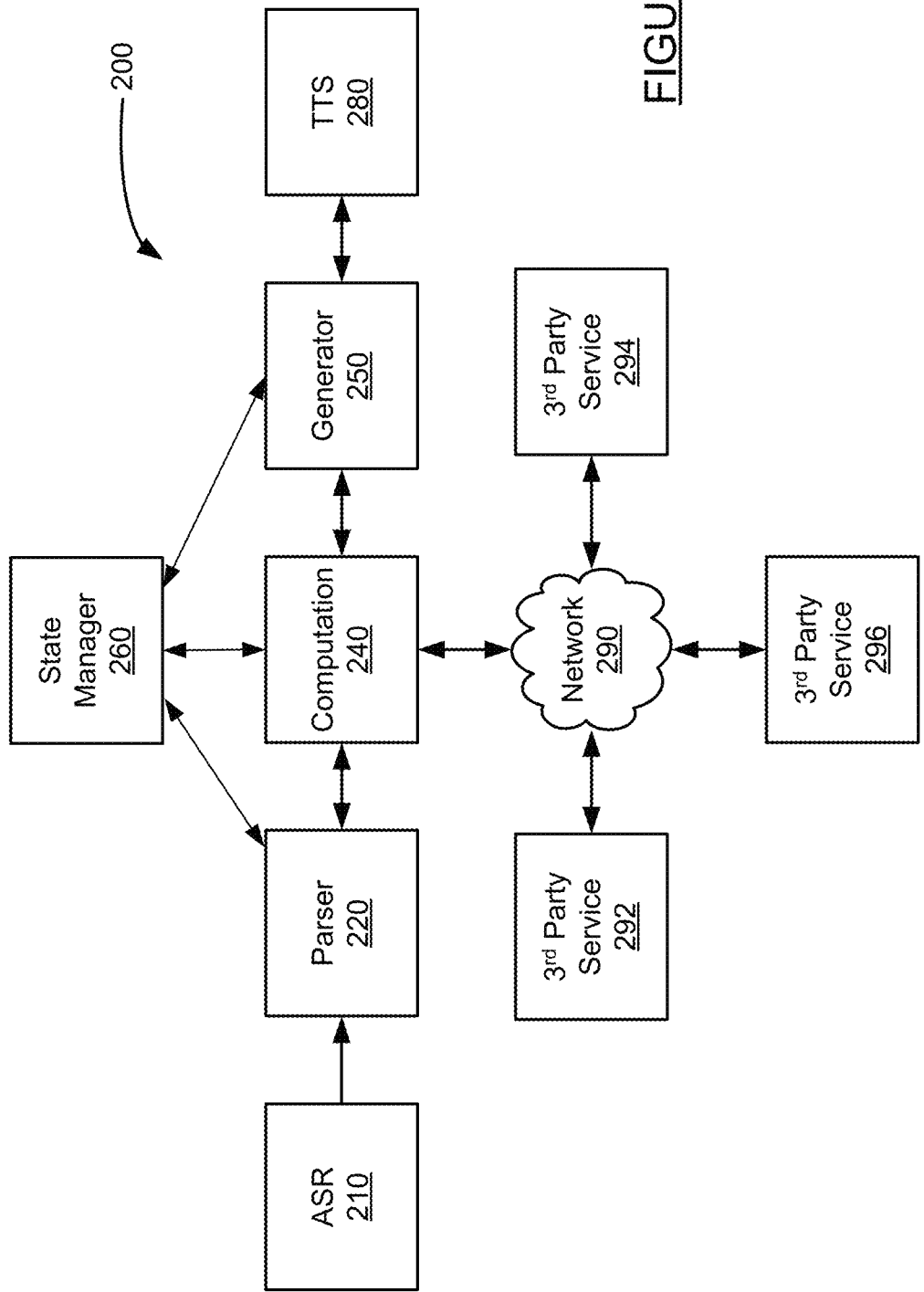
FIG. 2 illustrates exemplary modules for implementing an automated assistant application having a natural language content generator.

FIG. 2 illustrates exemplary modules for implementing an automated assistant application having a natural language content generator. The modules comprising the automated assistant application may implement all or a portion of application 112 of client 110, mobile application 122 of mobile device 120, and/or application 162 and server 160 in the system of FIG. 1. Additionally, each of modules 210, 220, 240, 250, 280, 292, 294, and 296 may be implemented in a different order, more than once, combined with other modules, or may be optional in the system of FIG. 2.

System 200 of FIG. 2 includes automatic speech recognition (ASR) module 210, parser 220, computation module 240, generator 250, state manager 260, and text to speech (TTS) module 280. Each of the modules may communicate as indicated with arrows and may additionally communicate with other modules, machines or systems, which may or may not be illustrated FIG. 2.

Automatic speech recognition module 210 may receive audio content, such as content received through a microphone from one of client 110, mobile device 120, or computing device 130, and may process the audio content to identify speech. The speech may be provided to parser 220 as well as other modules (not illustrated in FIG. 2).

Parser 220 may interpret a user utterance into intentions. In some instances, parser 220 may produce a set of candidate responses to an utterance received and recognized by ASR 210. Parser 220 may generate one or more plans, for example by creating one or more cards, using a current dialogue state received from state manager 260. In some instances, parser 220 may select and fill a template using an expression from state manager 260 to create a card and pass the card to computation module 240.

Computation module 240 may manage dialog (e.g., perform dialogue manager functions and act as a dialog manager) and examine candidate responses, such as plans, that are received from parser 220. The computation module may rank them, alter them, may also add to them. In some instances, computation module 240 may add a "do-nothing" action to the candidate responses. Computation module may decide which plan to execute, such as by machine learning or some other method. Once the computation module determines which plan to execute, computation module 240 may communicate with one or more third-party services 292, 294, or 296, to execute the plan. In some instances, executing the plan may involve sending an email through a third-party service, sending a text message through third-party service, accessing information from a third-party service such as flight information, hotel information, or other data. In some instances, identifying a plan and executing a plan may involve generating a response by generator 250 without accessing content from a third-party service.

State manager 260 allows the system to infer what objects a user means when he or she uses a pronoun or generic noun phrase to refer to an entity. The state manager may track "salience"—that is, tracking focus, intent, and history of the interactions. The salience information is available to the paraphrase manipulation systems described here, but the other internal workings of the automated assistant are not observable.

Generator 250 receives data from computation module 240, state manager 260, and utterances or texts from a user of the system. Generator 250 utilizes this data to generate rules, generate and maintain a dialogue state representation, generate object descriptions from the state representation, generate strings from the object descriptions, and perform other functionality as described herein. Once the strings are generated, they are provided to a translator 270.

TTS receives the paraphrase from translator 270 and performs speech synthesis based on the paraphrase using a neural network system. The generated speech (e.g., an audio file) is then output by TTS 280.

Additional details regarding the modules of Block 200, including a parser, state manager for managing salience information, a generator, and other modules used to implement dialogue management are described in U.S. patent application Ser. No. 15/348,226 (the '226 application), entitled "Interaction Assistant," filed on Nov. 10, 2016, which claims the priority benefit to US provisional patent application 62/254,438, titled "Attentive Communication Assistant," filed on Nov. 12, 2015, the disclosures of which are incorporated herein by reference. Additional details for an automated assistant application such as that of FIG. 2 are also described in U.S. patent application Ser. No. 15/792,236, filed Oct. 24, 2017, entitled "Sequence to Sequence Transformations for Speech Synthesis Via Recurrent Neural Networks," the disclosure of which is incorporated herein by reference.

Figure 3:
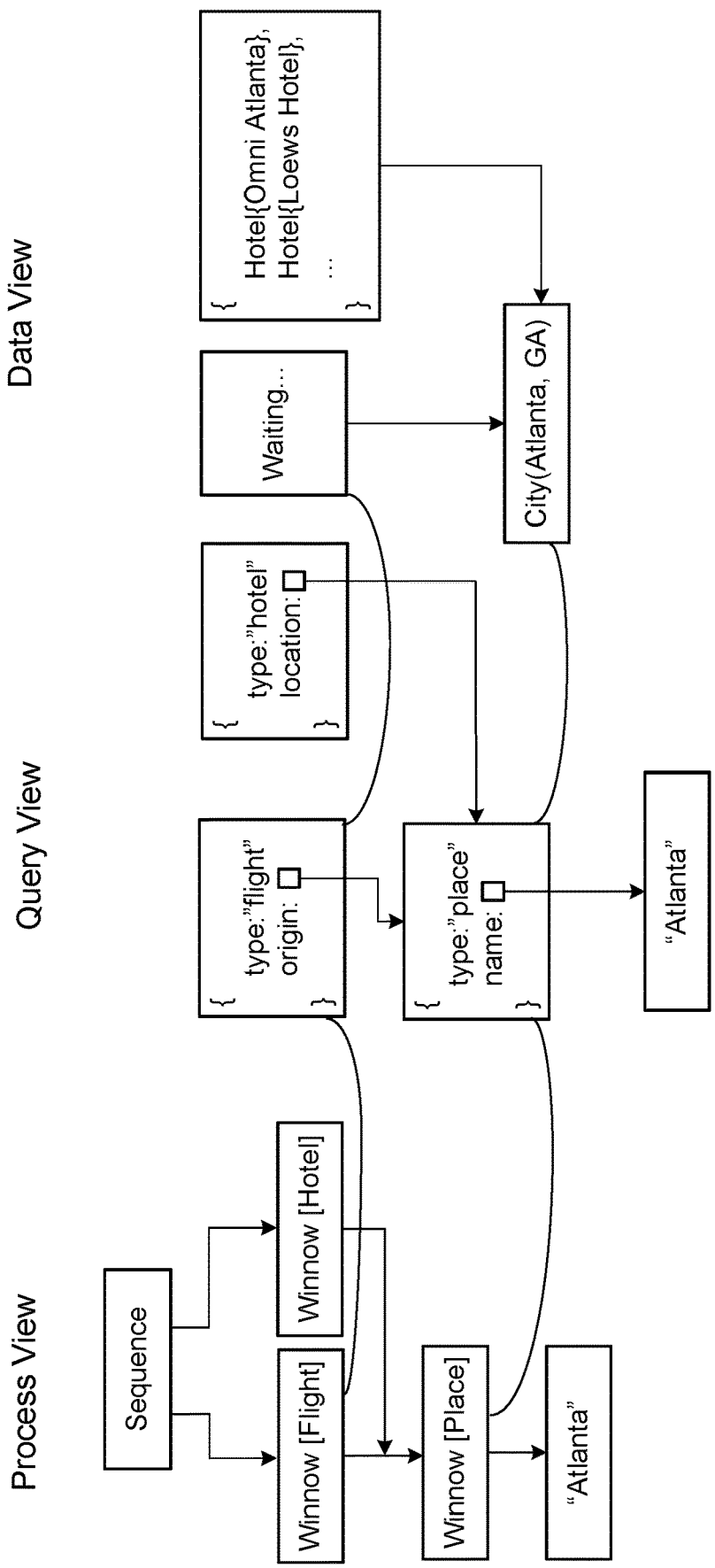
FIG. 3 illustrates a block diagram of a dialogue state representation.

FIG. 3 illustrates a block diagram of a dialogue state representation. The dialogue state representation is made of pairs of attributes and objects and includes a process view, query view, and data view.

A process view may correspond to the notion of dialogue state. This view keeps track of the representation of the world as a set of independent but communicating processes (like "help the user find a flight" or "help the user identify a location"). At every timestep, each of these processes proposes actions for the dialogue agent (either sending strings to the user or requests to a backend). Eventually, the process completes and returns a result (flight, location, etc.) The process view simply shows the names of these processes and the dependencies among them.

A query view may track the current state of the backend request. Most processes generate some kind of object as a result of interacting with a backend (e.g. a representation of a completed flight booking, a list of hotels, the date of the next long weekend, etc.). Every such process (in the process view) is associated with a query (in the query view). This query view shows the current state of the final request that its associated process will send to the backend to produce a result.

A data view shows results returned by the backend for those requests that are already able to be executed. Every query has an associated datum in the data view, but some of these data may be in an incomplete state (e.g. if the associated query is underspecified).

Figure 4:
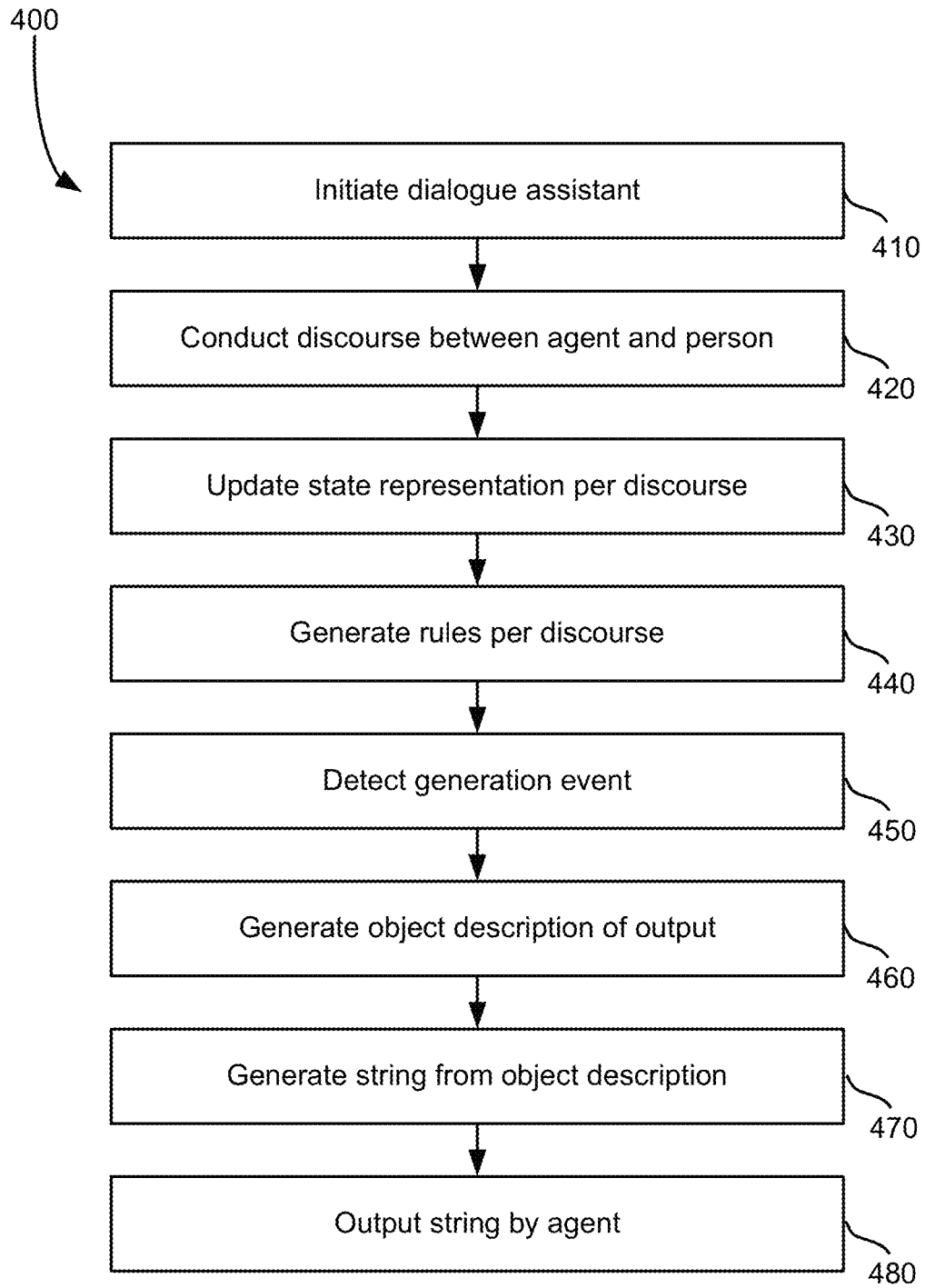
FIG. 4 illustrates a method for providing a natural language content generator.

FIG. 4 is a method for providing a natural language content generator. The method of FIG. 4 begins with initiating a dialogue assistant at step 410. Upon startup, a description of the domain is accessed and rules appropriate for the domain are automatically generated. The rules may be core rules that are generated for each and every domain, rules generated based on previous discourse between an agent or user having the same context or other similarity, and/or other rules. Core rules are discussed in more detail below with respect to the hypergraph of FIG. 10.

Discourse between an agent and a person is conducted through the dialogue assistant at step 420. A dialogue state representation is generated according to a plan the system is executing. For example, the state representation may be generated for a plan to make a flight reservation. As discussed earlier, a process view tracks representation of the world within the dialogue assistant as a set of independent but communicating process. The process view shows names of these processes. A query view tracks the current state of the backend request. Every process in the process view is associated with a query. The data view includes results that are returned by a backend or other third-party service for the requests that can be executed.

The dialogue state representation is updated as the discourse proceeds at step 430. Updating the state representation may include creating and maintaining lists of attributes and objects that are "given" and don't need to be mentioned by the agent to the user in subsequent communications. Attributes and objects that are not "given" include those that have been asked for, or those that need to be said with whatever else is in the discourse. More details for updating a state representation is discussed with respect to the method of FIG. 5.

Rules are automatically generated according to the discourse at step 440. In some instances, the system starts in a state A with a structured object. A human may then provide a string within the context of the structured object. The present system can use algorithms to generate, from a collection of things, a small rule. The generated rule can be used when the current context arises in the future as well as in other contexts and areas. As such, the rules automatically generated according to the disclosure can be used in several contexts, such as low-level communications from an agent to a user, and helps to allow top level descriptions to be generated based on annotation and other user input and to imitate what people say.

A generation event is initiated at step 450. The generation event may include gathering enough information within a plan to provide requested data, requiring more information from a user, or some other event. The generation event may be triggered within generation module 260 or some source external to the generation module.

An object description is generated at step 460. The object description may be generated based on a node in the process view and two other connected nodes—the query view and data view. Generating an object view may include identifying a generation behavior within a particular node, an analysis of the recency score for objects and attribute objects within the tree, and other steps. Generating an object description is discussed in more detail below with respect to the method of FIG. 7.

A string is generated from the object description at step 470. Generating a string may include calculating a score for a path within a hyperpath and selecting a score having the highest path. More details for generating a string are discussed with respect to the method of FIG. 9.

Figure 5:
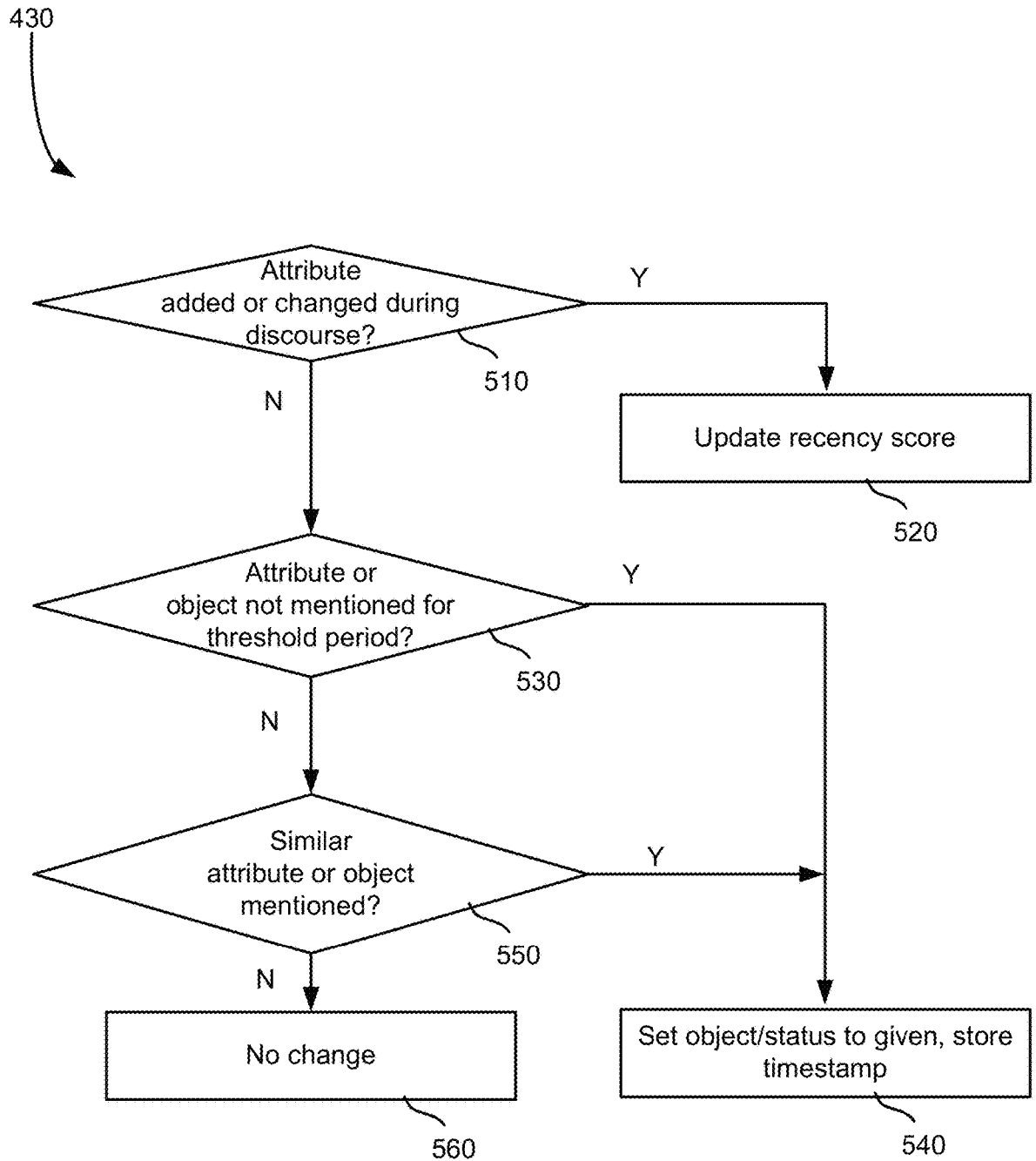
FIG. 5 illustrates a method for updating state representations.

FIG. 5 is a method for updating state representations. The method of FIG. 5 provides more detail for step 430 of the method of FIG. 4. First, a determination is made as to whether an attribute has been added or changed during discourse between the agent and user at step 510. If an attribute has been added or changed, for example by retrieving data by the computing module 240, the recency score is updated at step 520. Updating the score may include creating an initial recency score for the object attribute and modifying the recency score for other object attributes. Managing a recency score based on an attribute change or addition is discussed in more detail below with respect to the method of FIG. 6.

A determination is made as to whether an attribute or object is not mentioned in the threshold. At step 530. If an attribute or object has not been mentioned for a certain period of time, it is probably not relevant at the present point of the discourse and the status of that attribute or object is set to "given", where it is not to be mentioned by the agent, at step 540. If the attribute or object has been mentioned within the period of time, a determination is made as to whether a similar attribute or object has been mentioned at step 550. If no similar objects or attribute has been mentioned, then no change is needed to state representation at the current time based on the discourse. If a similar object or tribute has been mentioned, the object or status of the previous mention is set to "given" at step 540.

Figure 6:
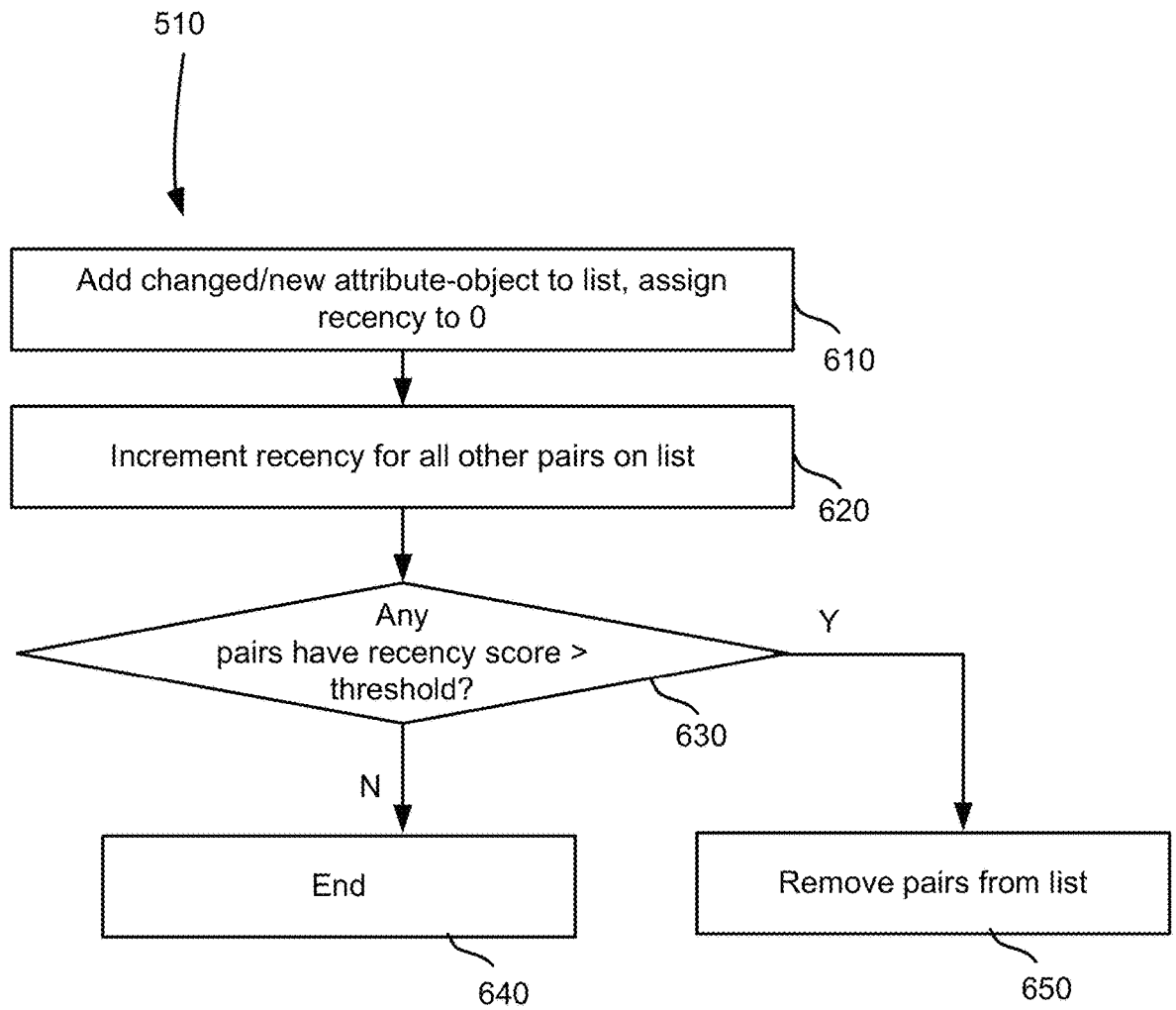
FIG. 6 illustrates a method for managing a recency score for attributes and objects.

FIG. 6 is a method for managing a recency score for attributes and objects. The method of FIG. 6 provides more detail for step 510 of the method of FIG. 5. First, the new or changed attribute object is added to a list and assigned a recency score of zero at step 610. The recency score for all the other pairs on the list is incremented at step 620. In some instances, the other pairs may be incremented by a value of one or may be incremented by different amounts depending on a weighting or context of the newly added or changed attribute object.

A determination is made as to whether any pairs in the list have a recency score greater than a threshold at step 630. In some instances, the threshold can be any number of transactions, additions, or other number at which a pair is not needed in an output by the agent. If any pairs have a recency score that is greater than the threshold, then they are determined to not be recent during the present discourse and they are removed from the list at step 650. If the pairs do not have a recency score greater than the threshold, they remain at the list in the process ends at step 640.

Figure 7:
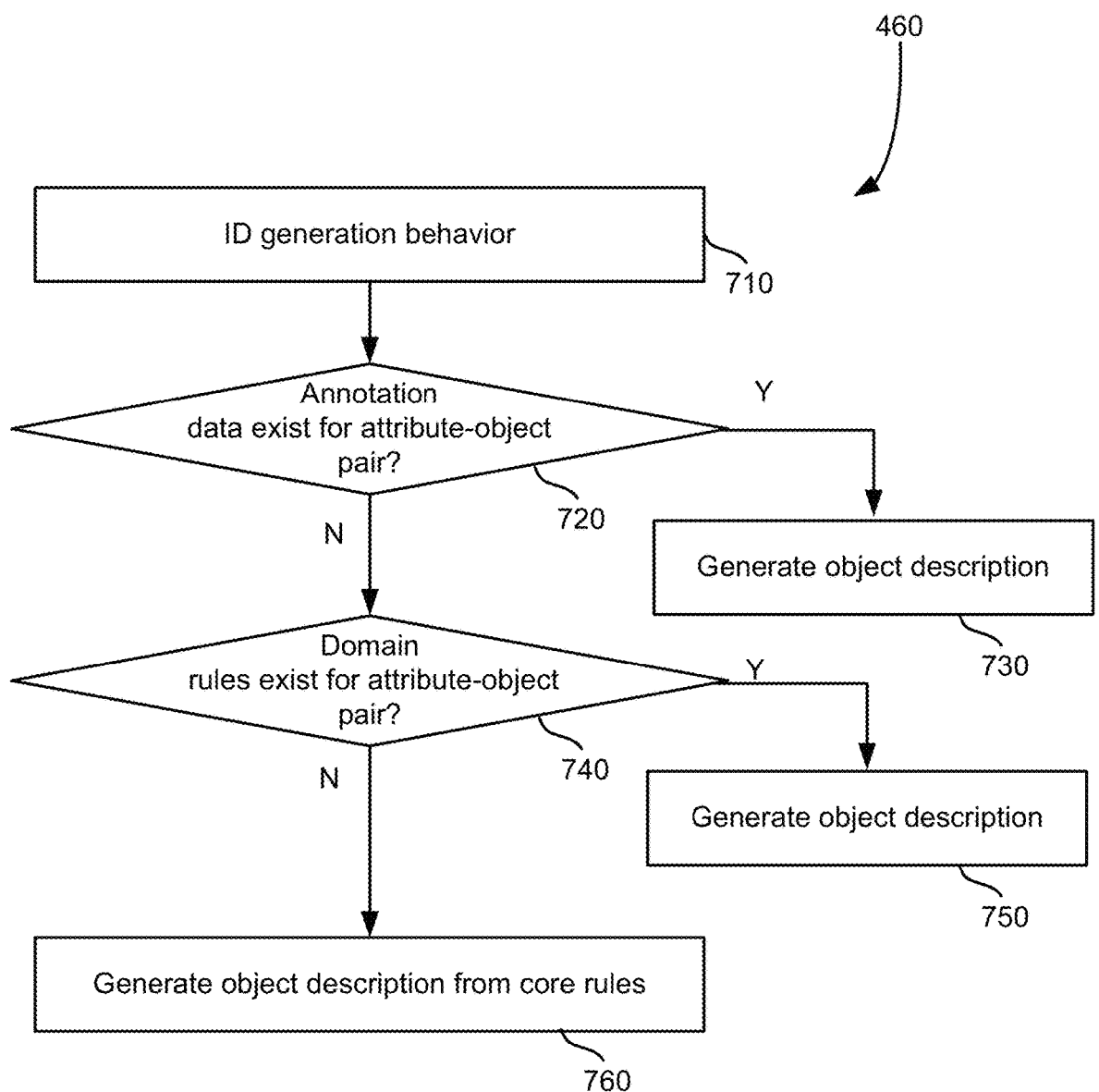
FIG. 7 illustrates a method for generating an object description.

FIG. 7 is a method for generating an object description. The method of FIG. 7 provides more detail for step 460 of the method of FIG. 4. First, a generation behavior is identified at step 710. The behavior may be identified based on a pointer that points to a particular node in the dialogue state diagram. More information for identifying generation behaviors is discussed with respect to the method of FIG. 8.

A determination is made as to whether annotation data exists for the attribute object pair identified at step 720. If annotation data exists, an object description is generated for the identify generation behavior at step 730. The object description may include a hyper graph with annotation template data. If an annotation does not exist to identify generated behavior, a determination is made as to whether domain rules exists for the attribute object pair at step 740. The domain rules may be generated by analyzing and processing the discourse between the agent and the user and may be context and/or domain specific. If domain rules exist, the object description is generated from the domain rules at step 750. If domain rules do not exist, then the object description is generated from core rules at step 760.

In some instances, annotation data may exist for the identify generation behavior, the more than one annotation template may exist. When more than one annotation template exists, a score may be calculated for each rule and the children rules, the template is associated with the highest score can be selected. The scores can be assigned by users, human agents, or algorithms that attempt to find consistent assignment of scores.

Figure 8:
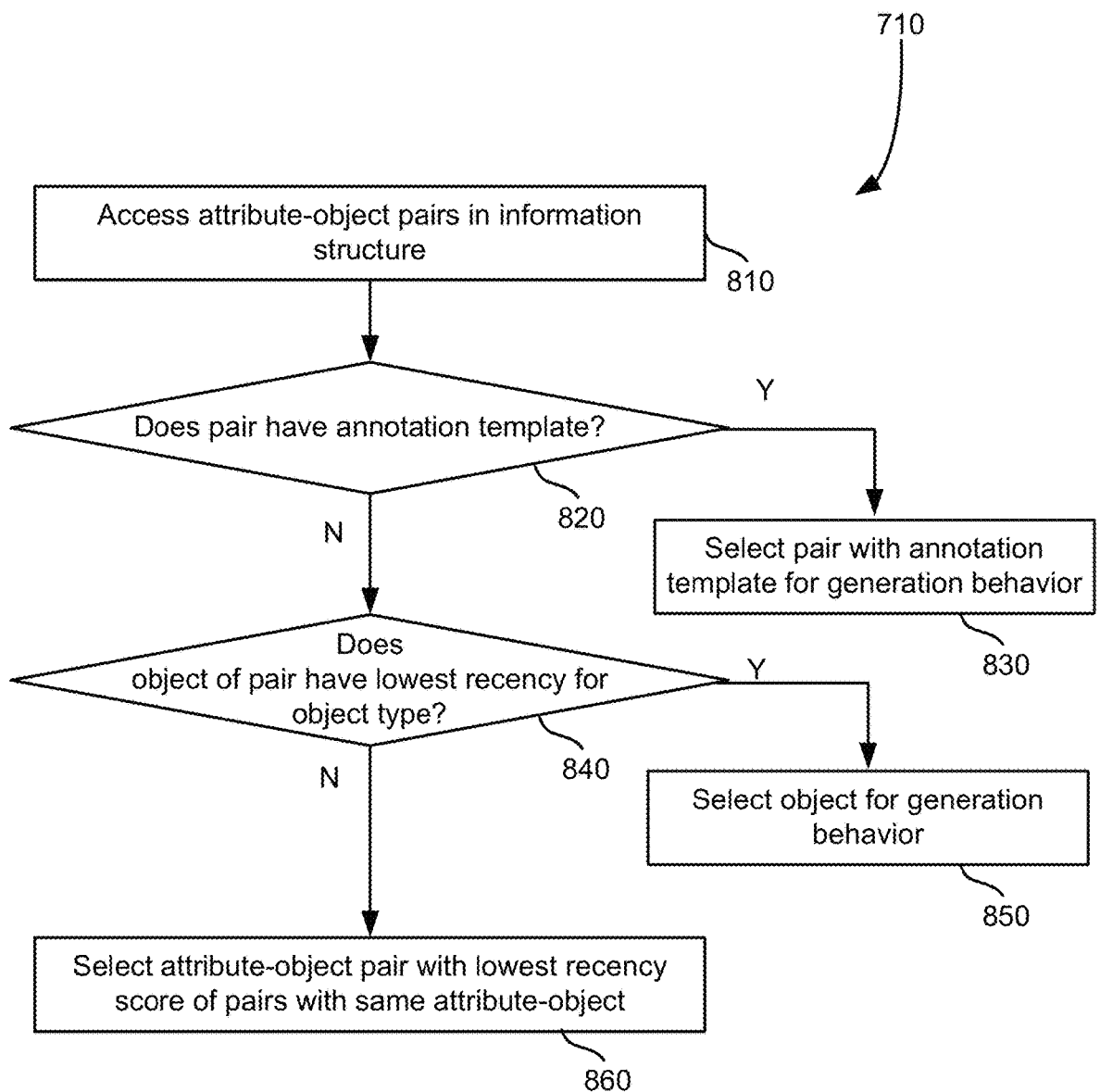
FIG. 8 illustrates a method for identifying generation behaviors.

FIG. 8 is a method for identifying generation behaviors. The method of FIG. 8 provides more detail for step 710 of the method FIG. 7. First, attribute object pairs in the information structure are accessed at step 810. A determination is then made as to whether a pair has an annotation template at step 820. If the pair does have an annotation template, the pair with the annotation template is selected for a generation behavior at step 830. If the pair does not have an annotation template, a determination is made as to whether the object of the pair has a lowest recency score for this object type at step 840. If a particular attribute object pair has an object in which no other object has a lower recency score for this object type, the object is selected for generation behavior at step 850. If the object does not have the lowest recency score, the attribute object pair with the lowest recency score of all pairs with the same attribute object type is then selected at step 860.

Figure 9:
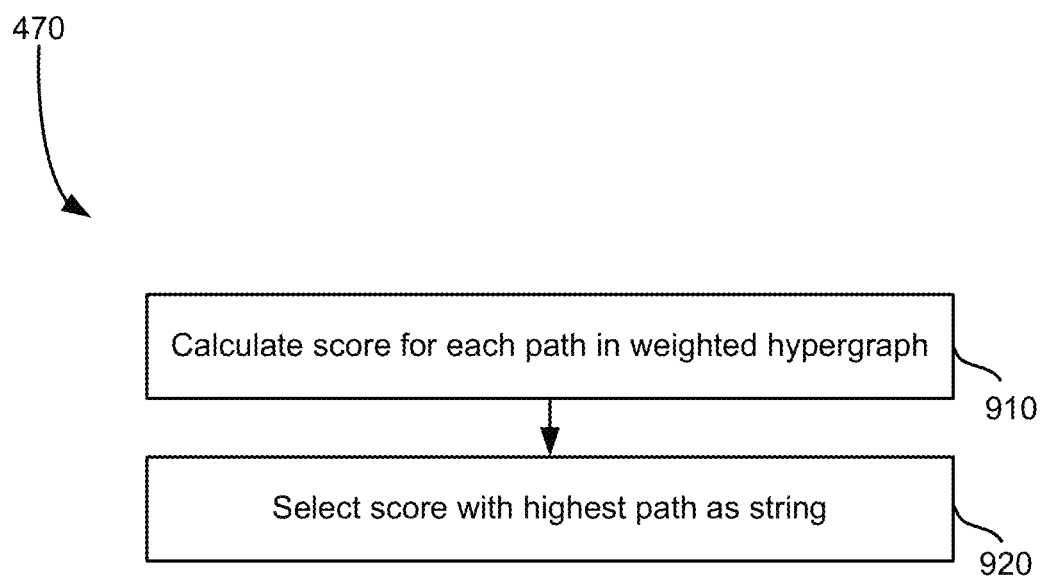
FIG. 9 illustrates a method for generating strings from object descriptions.

FIG. 9 is a method for generating strings from object descriptions. A score is calculated for each path in a weighted hyper graph at step 910. The score with the highest path is then selected as a string for output at step 920.

Figure 10:
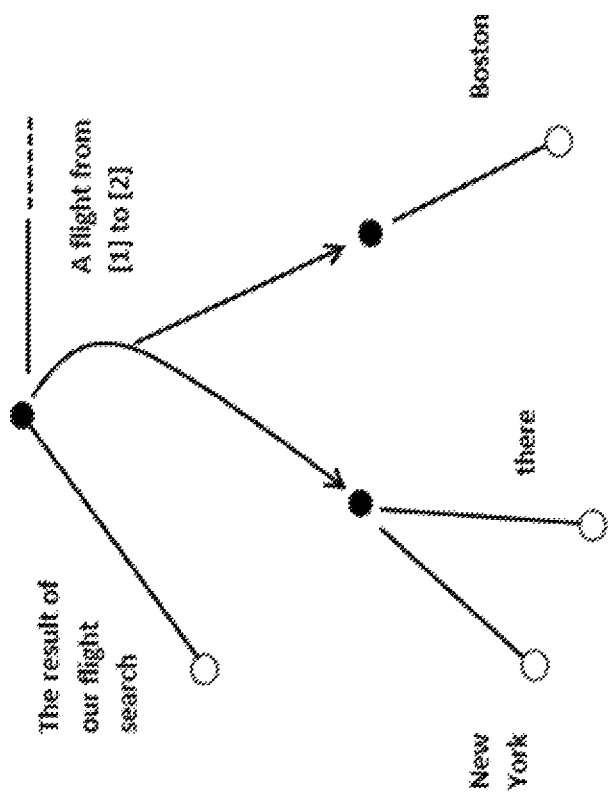
FIG. 10 illustrates a block diagram of a hyper graph.

FIG. 10 is a block diagram of a hyper graph. The hyper graph of FIG. 10 indicates a per segment connecting the result of our flight search from a first now to a second node is and connected to two other nodes. The path indicates a flight from [1] to [2] "Insert content for hyper graph" The first other node is connected to a New York node and a "there" node. The second node is connected to a Boston node.

Hypergraph nodes may be generated using core rules. Core rules provide a default mechanism for transforming any describable object into a hypergraph node. A simple core rule for describing an object (with a distinguished "name" field) might produce a hyperedge with the template string "name with attr1<value1>, attr2<value2>, and attr3<value3>", where name is the name of the object, all attrs are keys in the description, and all <value>s are template slots to be filled in. This hyperedge will have three tails, corresponding to the three slots. A core rule might also choose to omit some attributes based on context (as described under Choosing what to render below), or render the whole object as a (possibly qualified) anaphor (as described under Anaphora below). Fully rendered, this might concretely look like "a hotel with name Omni and location Chicago".

A core rule for describing an event might produce a hyperedge with a template string "<agent><verb><beneficiary><patient>" for a three-place verb, and four tails as in the preceding example. In English and many other languages, the precise ordering of arguments to verbs varies with verb identity, and can be obtained from an annotated resource like OntoNotes (http://www.aclweb.org/anthology/N06-2015). Fully rendered, this might look like "I booked you that flight". If a verb has multiple alternations, the core rule for events might produce multiple outgoing hyperedges, e.g. additionally "<agent><verb><patient>for <beneficiary>"->"I booked that flight for you."

Tenses, cases, etc. are applied by core rules based on the information contained in the generation context described above. Rules also make choices about which view to render in. Recall that generation begins at meta-nodes. To produce a concrete string, the system can decide e.g. whether to say "the result of our flight search", "a flight from Boston to New York", or "the flight leaving BOS at 9:30 and arriving at JFK at noon" (all of which are descriptions of the same meta-node in different views). The present technology will probably generate all three as outgoing edges and weight them differently based on the amount of information they contain and the broader context of the dialogue state. In some instances, core rules can be internationalized in code.

Rather than using this generic rendering code, in many cases the present technology describes certain kinds of objects in precise ways. For example, for a common kind of "lodging" object with attributes "type" (one of "shared room", "single room", "whole home", "whole apartment") and "cost", the present technology would rather say "a single room for $100/night" than "a lodging with type single room and cost $100".

Domain annotations can also be used to generate a hypergraph. The above examples are fine as fallback generation, but are not particularly natural sounding. On the other hand, domain rules are heavy-handed, and require that the present technology give up a lot of the custom logic for attribute selection or anaphora at all. The present technology would operate more efficiently if the domain rules are not reimplement them from scratch for every new kind of object. So, lightweight annotations that allow developers to specify a preferred ordering for attributes, rewrites of attribute names, etc.

For example:

```
{
    schema : flight,
    prefixes : {
        price : "[1]",
        isNonStop : "non-stop",
    }
    suffixes : {
        origin : "from [1]",
        destination : "to [1]",
        [origin, destination] : "between [1] and [2]"
```

```
        }
    }
```

These can be thought of as "meta-rules" which alter the way in which core rules are applied.

Descriptions contain all the information the dialogue system has about the state of the world. In some instances, the present technology may not want to talk about everything. This can be avoided in two ways: (1) writers of domain rules manually select which things to talk about and which things not to; (2) core rules use the discourse part of the generation context to determine which things are worth talking about. The representation of discourse context is basically the classical notion of information structure. The present system maintains a set of objects and (attribute, object) pairs that are given, and a set of attributes that are focused.

Core rules can use this discourse context in any of several ways. For example, every time the system chooses to render an (attribute, value) pair on an object, the attribute is added to the list of given (attribute, object) pairs. This new generation context is inherited both by rule applications lower in the hypergraph, and in subsequent sentences (as described in Inference below). Every time the system chooses to render an object, it is added to the list of given objects. Whenever the user asks a question about an attribute, the system can cause that attribute to become focused. When core rules are applied as described above, they ignore all (attribute, value) pairs that are given, and render objects that are given with an appropriate anaphor (that, there, it, etc.).

Once a hypergraph is constructed that encodes all the possible renderings of a given descriptor, the present system can turn it into a string. This is equivalent to finding the highest-scoring path in a weighted hypergraph, which can be done using standard algorithms. (http://www.aclweb.org/anthology/D09-1005) If the present system is designed to intersect the hypergraph with an n-gram language model, that can also be done efficiently. Recall that the generation process also depends on a generation context, which is constructed incrementally as the present system descends through the tree. Some edges in the generation hypergraph are not used in the final string, and the present system may want to make sure that objects mentioned only on those edges are not added to the given list. The present system may first run the inference procedure to find a highest-scoring path, and then accumulate generation contexts only along that path. This accumulated context is passed to the root of the next sentence that is generated. The same tools make it straightforward to get generation n-best lists.

Figure 11:
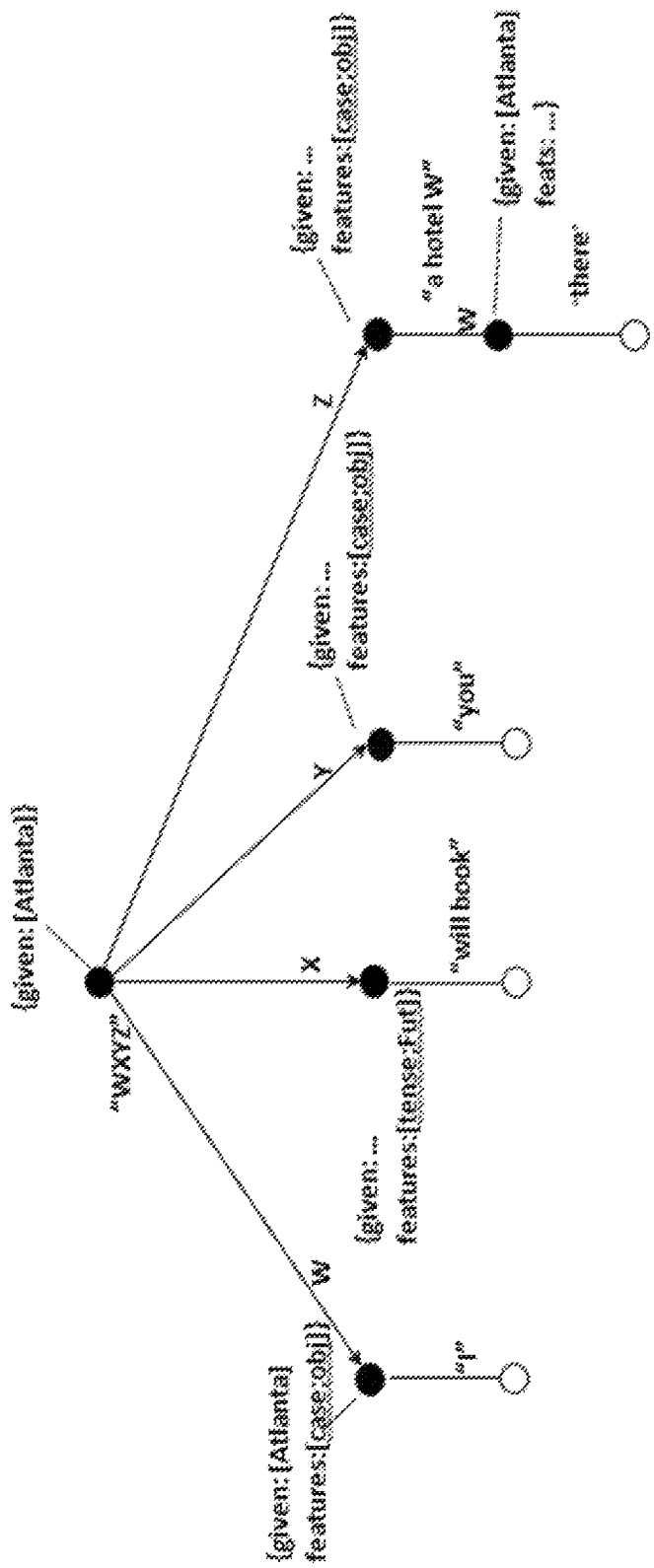
FIG. 11 illustrates a block diagram of a single path through a hyper graph.

FIG. 11 is a block diagram of a single path through a hyper graph. The single path includes generation contexts used for outgoing edge generation:

Generation with Learned Rules

The generation of content within an interaction can involve learned rules, including learning to reweight the hypergraph with hand-written rules, or learning a complete generation system from scratch. The present system may utilize one or more of at least two different sources of training data: humans annotators re-ranking the n-best list from the system, and human agents freely interacting with system users. In either training setting, it can be assumed that we have already aligned strings to dialogue states. This is straightforward to do with a training procedure of the present technology (xref to training patent).

Rule weights may be learned. Starting from the hand-written rules setting described above, it's extremely easy for developers to write down a set of rules with high recall and low precision—for every entity, provide a rule for every possible rendering (every combination of attributes or anaphoric mentions, every ordering, etc.). In this case, we just need to define a scoring function that weights every edge given the generation context and the entity we are trying to render. This scoring function can be implemented as either a CRF or a neural network, or in some other manner.

If learning from ranked system output, it's a straightforward parsing problem to find the set of hyperpaths that actually generate the desired string. In this case, the learning problem is to maximize the score assigned to all such hyperpaths while minimizing the score assigned to hyperpaths judged wrong in the given context. The present technology can use either a margin or likelihood loss, and train either the CRF model or the neural network model using direct gradient.

If learning from human output, it can be expected that the training strings will not be in system capacity. So, the present system first defines a measure of string similarity (e.g. BLEU or precision). Then, weights are chosen to maximize the expected similarity between training data and system output. This can be done by training the model the same way as above, doing hypergraph inference in an appropriate expectation semiring rather than directly maximizing the likelihood.

Figure 12:
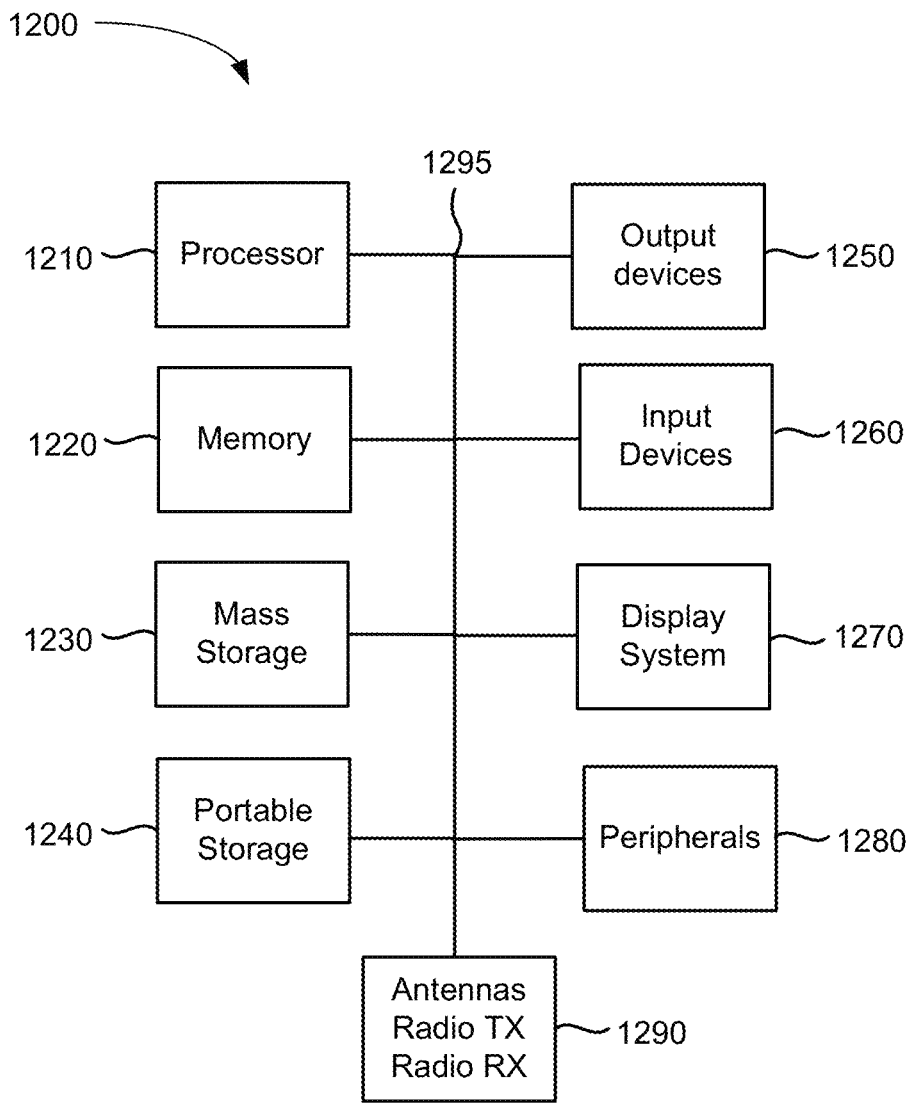
FIG. 12 illustrates a block diagram of an exemplary system for implementing the present technology.

FIG. 12 is a block diagram of a computer system 1200 for implementing the present technology. System 1200 of FIG. 12 may be implemented in the contexts of the likes of client 110, mobile device 120, computing device 130, network server 140, application server 160, and data stores 170.

The computing system 1200 of FIG. 12 includes one or more processors 1210 and memory 1220. Main memory 1220 stores, in part, instructions and data for execution by processor 1210. Main memory 1210 can store the executable code when in operation. The system 1200 of FIG. 12 further includes a mass storage device 1230, portable storage medium drive(s) 1240, output devices 1250, user input devices 1260, a graphics display 1270, and peripheral devices 1280.

The components shown in FIG. 12 are depicted as being connected via a single bus 1290. However, the components may be connected through one or more data transport means. For example, processor unit 1210 and main memory 1220 may be connected via a local microprocessor bus, and the mass storage device 1230, peripheral device(s) 1280, portable or remote storage device 1240, and display system 1270 may be connected via one or more input/output (I/O) buses.

Mass storage device 1230, which may be implemented with a magnetic disk drive or an optical disk drive, is a non-volatile storage device for storing data and instructions for use by processor unit 1210. Mass storage device 1230 can store the system software for implementing embodiments of the present invention for purposes of loading that software into main memory 1220.

Portable storage device 1240 operates in conjunction with a portable non-volatile storage medium, such as a compact disk, digital video disk, magnetic disk, flash storage, etc. to input and output data and code to and from the computer system 1200 of FIG. 12. The system software for implementing embodiments of the present invention may be stored on such a portable medium and input to the computer system 1200 via the portable storage device 1240.

Input devices 1260 provide a portion of a user interface. Input devices 1260 may include an alpha-numeric keypad, such as a keyboard, for inputting alpha-numeric and other information, or a pointing device, such as a mouse, a trackball, stylus, or cursor direction keys. Additionally, the system 1200 as shown in FIG. 12 includes output devices 1250. Examples of suitable output devices include speakers, printers, network interfaces, and monitors.

Display system 1270 may include a liquid crystal display (LCD), LED display, touch display, or other suitable display device. Display system 1270 receives textual and graphical information and processes the information for output to the display device. Display system may receive input through a touch display and transmit the received input for storage or further processing.

Peripherals 1280 may include any type of computer support device to add additional functionality to the computer system. For example, peripheral device(s) 1280 may include a modem or a router.

The components contained in the computer system 1200 of FIG. 12 can include a personal computer, hand held computing device, tablet computer, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS or iOS, Android, and other suitable operating systems, including mobile versions.

When implementing a mobile device such as smart phone or tablet computer, or any other computing device that communicates wirelessly, the computer system 1200 of FIG. 12 may include one or more antennas, radios, and other circuitry for communicating via wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. A method for providing a conversational system that generates natural language content, comprising:

maintaining, on a computing device, a dialogue state representation for a conversation between a user and an agent executing on the computing device, wherein the dialogue state representation includes a hypergraph including a plurality of hyperedges, each hyperedge having an associated natural language description;

recognizing a content generation event initiated by the agent, designating an object to be described;

selecting, with a previously-learned scoring function, a hyperedge in the hypergraph associated with a first attribute of the object;

outputting an associated natural language description of the first attribute of the object;

updating the hypergraph to indicate that the associated natural language description of the first attribute of the object was output;

recognizing a subsequent content generation event initiated by the agent, designating the same object to be described;

selecting, with the previously-learned scoring function, a different hyperedge in the hypergraph associated with a second, different attribute of the object; and outputting an associated natural language description of the second, different attribute of the object.

2. The method of claim 1, wherein the dialogue state representation includes a process view, query view, and a data view.

3. The method of claim 1, wherein the first attribute of the object and the second, different attribute of the object are part of a subset of a list of object-attribute pairs associated with the object, and wherein the natural language description of the first attribute of the object is a first natural language description, and the natural language description of the second, different attribute of the object is a second, different natural language description.

4. The method of claim 3, wherein the subset is selected based on recency score.

5. The method of claim 1, wherein the hypergraph includes learned annotation rules learned from user annotations, the object description generated based on the learned annotation rules learned from user annotations.

6. The method of claim 5, wherein the learned annotation rules learned from user annotations include rules for ranking different attributes in the hypergraph for inclusion in an associated natural language description of the object.

7. The method of claim 1, wherein the previously-learned scoring function is trained with regard to a plurality of training examples, each training example including an object and an exemplary description for the object, wherein the previously-learned scoring function is trained to maximize a score associated with the exemplary description of the object.

8. A computing device for providing a conversational system that generates natural language content, comprising:
a processor;
memory;
one or more modules stored in memory and executable by the processor to:
maintain a dialogue state representation for a conversation between a user and an agent executing on the computing device, wherein the dialogue state representation includes a hypergraph including a plurality of hyperedges, each hyperedge having an associated natural language description;
recognize a content generation event initiated by the agent, designating an object to be described;

select, with a previously-learned scoring function, a hyperedge in the hypergraph associated with a first attribute of the object;

output an associated natural language description of the first attribute of the object;

update the hypergraph to indicate that the associated natural language description of the first attribute of the object was output;

recognize a subsequent content generation event initiated by the agent, designating the same object to be described;

select, with the previously-learned scoring function, a different hyperedge in the hypergraph associated with a second, different attribute of the object; and output an associated natural language description of the second, different attribute of the object.

9. The computing device of claim 8, wherein the dialogue state representation includes a process view, query view, and a data view.

10. The computing device of claim 8, wherein the first attribute of the object, and the second, different attribute of the object are part of a subset of a list of object-attribute pairs associated with the object.

11. The computing device of claim 10, wherein the subset is selected based on recency score.

12. The computing device of claim 8, wherein the hypergraph includes learned annotation rules learned from user annotations, the object description generated based on the learned annotation rules learned from user annotations.

13. The computing device of claim 12, wherein the learned annotation rules learned from user annotations include rules for ranking different attributes in the hypergraph for inclusion in an associated natural language description of the object.

14. The computing device of claim 8, wherein the previously-learned scoring function is trained with regard to a plurality of training examples, each training example including an object and an exemplary description for the object, wherein the previously-learned scoring function is trained to maximize a score associated with the exemplary description of the object.

15. A method for providing a conversational system that generates natural language content, comprising:

receiving a plurality of training examples, each training example including a training example object and an exemplary description for the object;

training a previously-learned scoring function, wherein the previously-learned scoring function is trained with regard to each training example object, to maximize a score associated with the exemplary description of the object;

maintaining, on a computing device, a dialogue state representation for a conversation between a user and an agent executing on the computing device, wherein the dialogue state representation includes a hypergraph including a plurality of hyperedges, each hyperedge having an associated natural language description;

recognizing a content generation event initiated by the agent, designating an object to be described;

selecting, with the previously-learned scoring function, a hyperedge in the hypergraph associated with a first attribute of the object;

outputting an associated natural language description of the first attribute of the object;

updating the hypergraph to indicate that the associated natural language description of the first attribute of the object was output;

recognizing a subsequent content generation event initiated by the agent, designating the same object to be described;

selecting, with the previously-learned scoring function, a different hyperedge in the hypergraph associated with a second, different attribute of the object; and outputting an associated natural language description of the second, different attribute of the object.

16. The method of claim 15, wherein the dialogue state representation includes a process view, query view, and a data view.

17. The method of claim 15, wherein the first attribute of the object, and the second, different attribute of the object are part of a subset of a list of object-attribute pairs associated with the object.

18. The method of claim 17, wherein the subset is selected based on recency score.

19. The method of claim 15, wherein the hypergraph includes learned annotation rules learned from user annotations, the object description generated based on the learned annotation rules learned from user annotations.

20. The method of claim 19, wherein the learned annotation rules learned from user annotations include rules for ranking different attributes in the hypergraph for inclusion in an associated natural language description of the object.

* * * * *